(12) United States Patent
Williams

(10) Patent No.: US 6,292,828 B1
(45) Date of Patent: Sep. 18, 2001

(54) TRANS-MODAL ANIMATED INFORMATION PROCESSING WITH SELECTIVE ENGAGEMENT

(76) Inventor: David L. Williams, 1168 Wheatley Dr., Lilburn, GA (US) 30247

( * ) Notice: Subject to any disclaimer, the term of this patent is extended or adjusted under 35 U.S.C. 154(b) by 0 days.

(21) Appl. No.: 08/200,739

(22) Filed: Feb. 23, 1994

(51) Int. Cl.$^7$ ..................................... G06F 15/16

(52) U.S. Cl. .................. 709/218; 709/217; 709/224; 340/825.06; 340/825.08

(58) Field of Search ................................ 709/217, 218, 709/224, 227, 240, 250; 340/825.06, 825.08, 825.1, 825.11, 825.13

(56) References Cited

U.S. PATENT DOCUMENTS

| 6,226,765 | * | 5/2001 | Le et al. ............................... 714/718 |
| 6,230,114 | * | 5/2001 | Hellestrand et al. ................... 703/13 |
| 6,237,786 | * | 5/2001 | Ginter et al. .......................... 213/153 |

* cited by examiner

Primary Examiner—Thomas R. Peeso

(57) ABSTRACT

Broadcast and/or dedicated signals are generated and transmitted to one or more wired or wireless receiving stations. Signal receptions are qualified according to embedded code or compared to other predetermined specifications, and respectively forwarded as necessary to other circuits and devices, whether on-site or remote. Critical oversight of information and processes is executed by polled or polling devices or users, which interact with a predetermined array of intelligently-evolving queries or responses. In one embodiment of the present invention, one or more devices are polled as necessary for intelligence inputs and possible intervention in system processes. Users input responses or directives into a three-button device integrated into the side of a telephone handset: the three buttons corresponding ergonomically with the three middle fingers of the user's favored hand. The user is thereby enabled to articulate an interface with a polled or polling device, with a minimal degree of distraction from events in the surrounding environment. Users or proxy monitoring devices are allotted the option of more or less immediate involvement in the system's oversight and management, depending on developing events or lack thereof. In the preferred embodiment of the present invention, the three aforementioned buttons, or "triggers", correspond to electronically-activated analog or digital switches which detected signals encoded in the program intelligence. These triggers may report the following options in terms of the user/device availability or intention of impending intervention: (1) deferred or delayed interaction, (2) limited, qualified, or intermediate interaction, or (3) full or formulative interaction.

31 Claims, 3 Drawing Sheets

FIG. 2

Figure 1:
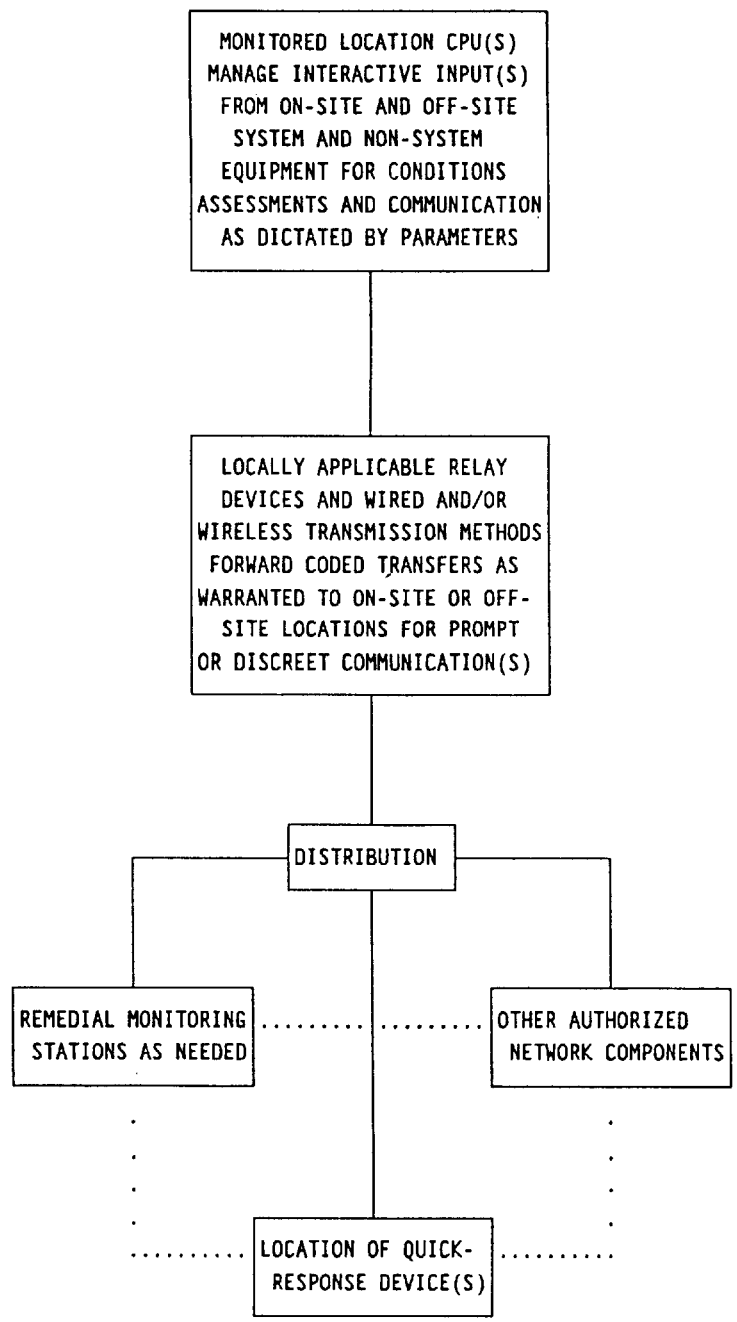

IN MANUAL VERSION(S), TYPICAL
EMBODIMENTS MAY FEATURE ECONOMICAL
ALL-SOLID OR BRAILLE-TYPE MANUAL
"TRIGGERS" ARRAYS FOR DEXTROUS
MANIPULATION; ENHANCED VERSIONS
MAY BE APPOINTED WITH ROTARY OR
OTHERWISE MANIPULATED "TRIGGERS"
FOR FURTHER APPLICATION

HORIZONTALLY, VERTICALLY, OR
ALTERNATELY MANIPULATED MANUAL
"TRIGGERS" APPARATUS(ES) ENHANCE
SURETY AND MULTIPLICITY OF
INTERACTION(S)

"TRIGGERS" LOCATED ATOP
THIS CONFIGURATION

IN ENHANCED EMBODIMENT(S),
ERGONOMIC "TRIGGERS" MAY BE
ALTERNATELY OR CONCURRENTLY
CONFIGURED AS MANUALLY, ACOUSTICALLY,
OR ELECTRONICALLY-DEPLOYED

NUANCED OR CODED ROUTINES MAY
BE PREDETERMINED OR ACCESSED

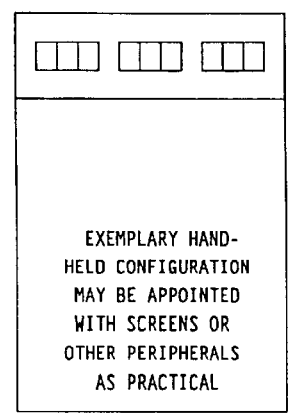

OPTIONAL ACOUSTICALLY-SENSITIVE CENTER
VOID(S) WITH PROTECTIVE COVERS FOR
ENHANCED UTILITY

PROMPT OR ROUTINE MODES OF
FUNCTIONAL PLATFORM(S) MAY
DETERMINE OR CUSTOM-TAILOR
CONFIGURATION OF DEVICES,
PROGRAMS, OR COMPONENTS

DEVICE MAY ACCESS PERIPHERALS
THROUGH MODULAR EXTERNAL JACKS
FOR WIRED OR WIRELESS RELAY

EXEMPLARY HAND-
HELD CONFIGURATION
MAY BE APPOINTED
WITH SCREENS OR
OTHER PERIPHERALS
AS PRACTICAL

DEPENDING ON CONFIGURATIONS OR
ROUTINES, UNIT(S) MAY ACCEDE TO
LOCAL OR SYSTEM ALARM(S) MODE(S)

UNITS WITH MULTI-MODAL
ASPECT CONDUCIVE TO AFFLUENT
OR INSURED MODES OF OPERATION

ENHANCED VERSIONS MAY DESIGNATE
BACKUP POWER & DATA MODES FOR ON-
SITE OR OFF-SITE COMPONENTS

ENHANCED CONFIGURATIONS ADAPTABLE TO
MULTI-MODAL CONFIGURATION(S) WITH
ADVANCED OR ALTERNATE RECEPTION,
STORAGE, PROCESSING, OR SIGNALLING

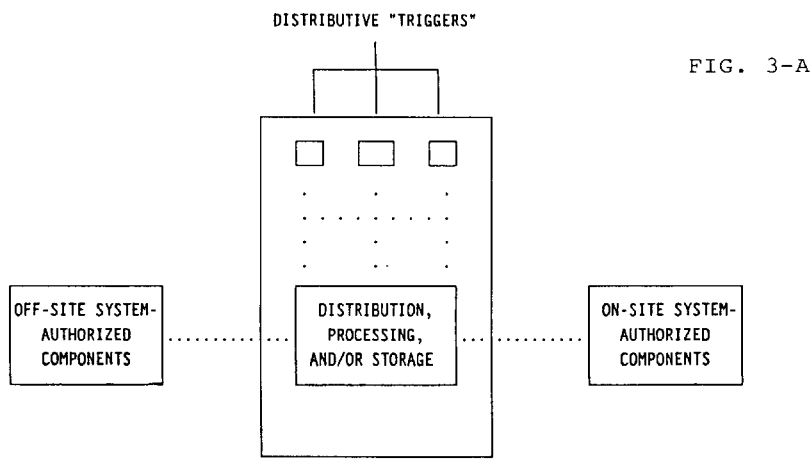
FIG. 3-A
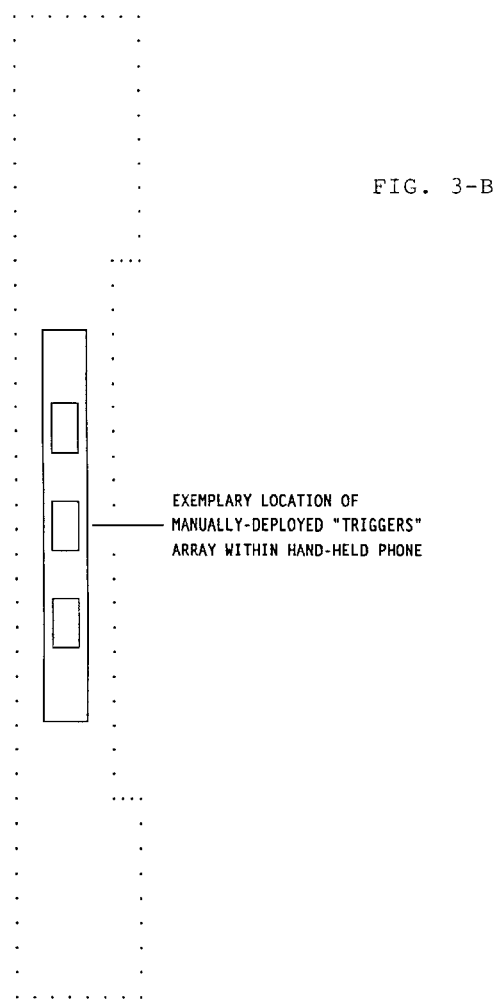
FIG. 3-B
EXEMPLARY LOCATION OF MANUALLY-DEPLOYED "TRIGGERS" ARRAY WITHIN HAND-HELD PHONE

TRANS-MODAL ANIMATED INFORMATION PROCESSING WITH SELECTIVE ENGAGEMENT

BACKGROUND—FIELD OF THE INVENTION

This invention relates to monitored or monitoring circuits or networks comprising electronic communication or transfer components, specifically to user-friendly methodology for enhanced securitization, collection, processing, and/or distribution.

Background—Description of Prior Art

Surely tens of thousands of patents have been issued in the past 100–120 years in the telephony, radio, microwave, computer, cable, television, and electrical classifications. In recent years improvements have been made to telephony by the utilization of computer technology and the introduction of digital transmission, which is rapidly replacing analog transmission. Call waiting, call return, call forwarding, call blocking, and conference calling are but a few enhancements brought forth with the development of digital processing. These improvements, although laudable in their own right, fail to address the problems inherent in, say, running a household or a small business. More succintly, although considerable gains have been made in the respective and disparate fields of endeavor, very little has been done to enrich the American standard of living through notable advancement of communications fluency or safety standards.

In March, 1993 the American computer industry was still in the doldrums. In 1992, IBM had asked the federal government to intercede with financial aid. The telephone industry and Wall Street were getting ready for a slow summer in an aging bull market. The telephone industry was developing their land-line communication capabilities to include video transmission. The cable industry was preparing to be de-regulated, and busy with the development of two-way cable communication to compete directly with the phone companies. The Federal Communications Commission had announced that certain bands of the radio spectrum would be opened up for commercial use. Even electric utility providers were experimenting with the use of copper and alloy cables to eventually provide "spread-spectrum" signal communication capability through their systems. The respective players in this new and increasingly diverse communications arena were scrambling to develop their own products and services, wondering who would be the winners and losers on this new and crowded playing field. American Telephone and Telegraph's new Videophone and the EO Personal Digital Assistant had yet to reach the market. Apple's Newton Personal Digital Assistant was yet further away on the horizon. I felt that these tools had all somehow missed the mark. When the World Trade Center was bombed, I sensed an urgency to resolve some of our communication and security system shortcomings.

Over the past five years, I had begun to appreciate the advantage and possibilities of the computer and telephone in the operation of a service-based business. I found call forwarding to be a useful tool in automatically forwarding calls from my home phone through a cellular phone as early as 1988. I later surmised that a beeper could be useful for remote notification of events through graphical display. It followed that a computer or network could gather any form of data at one or more locations and notify users or devices at remote locations for selective interactions. The remote devices could include multiple communications media for flexibility and continuity of system access. Such a device would have to be user-friendly, however, in terms of size and manageability. A smaller yet more versatile "smart" device would be more functional, with provision for a basic communication media, say radio or microwave, to and from a home, office, mobile, etc., central processing unit(s) or network device(s). The fixed or mobile local enhancement network could automatically retrieve, record, manipulate, manage, or dispatch communications to and from any authorized on-site or off-site device. It followed that, with the advances in the development of High-Definition Television, as well as two-way digital transmission via cable, that the television would prove to be an important multi-media device when used in conjunction with more diverse communications media. This central processing unit/multi-media information reception and broadcasting center could automatically notify other on-site or off-site components of historic, ongoing, or proposed interactions. An internal database could be constructed for cognitive analysis of events and patterns, with automated formulation of remedial programs and interactions as warranted by parameters and inputs. Computer analysis and qualification of incoming or ongoing routines, conditions, or interactions could trigger further input requests to and from users and devices according to priority schedules and interactions and events. Continuous, interval, or events-driven diagnostic routines or queries could help insure safety of the users and components in the system, as well as assisting with selective cognitive and formulative modes of interactive switching. Securitization features such as coding, nuances, or interrogatory routines, and intelligent management, could be used to safeguard system integrity and users.

Such a system could be used for security, quality control, systems control, inventory control, automated communications reception, automated research, automated production, traffic management, personnel efficiency, patient critical care monitoring, civil defense, etc. The list of possible applications seemed endless. It was obvious, however, that the influx of data could easily overwhelm the user with a deluge of data at less opportune moments. The volume of data, as well, could overwhelm the efficiency of the system. A system was needed which could dispense much of its own prioritizing and judgment-making. Of equal importance was the necessity for a human-assisted means of quickly, deftly, discreetly, and judiciously delegating responsibility for incoming calls between the network components and the user. Anyone who has attempted to manipulate multiple incoming calls on a car phone in traffic during rush hour knows the awkward insidious nature of this situation. Anyone who has received a call during an important business meeting will attest to the intrusion factor. Anyone who has owned a portable phone or a beeper for any length of time knows there are times when the incessant drubbing of the senses can bring back fond memories of days without such modern appurtenances.

I had often wondered how delegation of authority for panning sequences was managed by camera crews filming sporting events. I learned that switching of remote cameras was accomodated by a crew viewing multiple monitors located in an on-site truck or trailer. It seemed to me that if each remote camera were equipped with a switching apparatus, communication of a "virtual dialogue" could be accomplished with a single or appropriately configured array of buttons, or "triggers", and a minimum of distraction to the user. Requests for live camera time could be polled from the individual cameras to one or more central processing units, which are equipped with compatible version(s) of the "triggers" array comprising manual, voice, or software configurations. A human supervisor could be equipped with a "remote", or hand-held device containing the "triggers" apparatus, for advanced intercessory empowerment. The system could thus manage much of its own switching based on parameters and inputs, including polled requests for camera time. Over time such a system could develop a database for critical overview of the system, devices, or users, and make adjustments, suggestions, or requests as necessary. Nascent authority for ongoing or impending routines could be delegated as necessary, between the system and the user or supervisor, dictated by availability or applicability of each. Advanced diagnostic, security, or transfer modes could typically be managed by either or both the user and the system, with welfare and authority of human components typically designated as first priority, where applicable. This system could also be used by on-camera commentators to facilitate enhancement of switching as necessary, and according to availability.

The solution was a system which would signal appropriate users or devices with a minimum of intrusion, and offer predetermined queries or notifications in a quick-response format. Initial quick-response options could consist of an array of responses ranging from, say: deferred or delayed interaction, to; intermediate, qualified, or limited interaction, to; full or formulative interaction. A minimal array of buttons, or triggers, could accommodate multiple interactions in most cases. In an ergonomic embodiment to be incorporated in hand-held or hand-manipulated device configurations (cellular phones, etc.), three buttons are located where the user's three middle fingers normally rest on the handset or device. Respective functions of these buttons are learned (or custom programmed) by the user. This configuration facilitates timely responsive interaction with the signalling party without the necessity for even a glance at the phone. The user may also be enabled to manipulate further routines or other incoming calls while remaining conversant with a first caller, through singular or multiple concurrent or alternate manipulation of the "triggers" apparatus. Peripheral components such as heads-up visual displays or other manipulatory aids may be employed to further facilitate enhanced recognition and data perusal. Wired or wireless media may be employed for deployment of these extraneous system-authorized components. Subsequent routines as dictated by site-based or mobile microprocessors or central processing units may be offered or advanced, based on events, formulations, conditions, or user preferences. These sub-routines may be in a format compatible with the triggers apparatus, to allow further user-friendly presentation and prompt user dispensation. Of course, this same type of return signalling can be accomplished with voice-activated triggers; however, these may prove less reliable than the manual triggers in, say, a loud environment. Depressing designated buttons directly from the existing touch-pad on the telephone will produce the same results, although ease of manipulation and convenience are forfeited. The touch-pad configuration can be altered somewhat to satisfy the ergonomic user-friendly consideration.

Messaging from system or non-system devices which are received at the quick-response triggers apparatus may be directly postulated, with recognition comprising minimal considerations. In other words, recognition of polling component area code, device code, or priority code may trigger appropriate menu selections. Alternately, incoming messages may specify a number of options which are received by the triggers apparatus and disseminated in a workable format for ease of disposition at the user's fingertips. If audible signalling mode is nascent priority at the triggers apparatus, voice or other sonant notification may be presented. Visual or lighted, tonal, or nuanced musical signalling may also be presented, based on user preferences and availability for involvement. Pre-set or custom signalling, modes, and parameter changes can be programmed directly into the unit and system, to accommodate more or less interaction as dictated by the system application and the user's availability. Thus a triggers-equipped device may be intelligently programmed to manage priority schedules and tasking assignments according to predetermined routines. Designation of nascent degree of availability or responsibility for system management may be acquired or retained by individual components, depending on conditions as defined by user or system parameters. Flow of data and transmissions throughout the system may be automatically manipulated through relay and monitoring stations equipped with a version of this switching protocol. Fixed or remote user stations may be equipped with multiple channels, multiple wired or wireless communications media/modes, and multiple microprocessors. System-assisted switching may be employed to enhance hot-switching and introduction of other transmission media and modes. Other off-site terminal or remedial monitoring stations may be appointed or allocated as signal reception stations, with proper user or system authorization.

With the introduction of alternate and multiple modes and media, the system becomes a solution for the achievement of asynchronous transfer mode. Multi-media and multi-modal capabilities have the extra benefit of incremental reliability of an insured reception from at least one source, thus surpassing that of a system with only one communication means. After further study and development, it was obvious that my innovation could be adapted to innumerable applications. Limited only by physical, technical, or financial considerations, the innovation, system, and/or apparatus can be applied to any wired or wireless electric or electronic application wherein system formulations and actions may be enhanced by intelligent system self-manipulation with human or other intercession as deemed necessary by system or user perceptions. The most marketable configurations appear to be those related to enhancement of information dissemination, home or business network functions, or systems management. Of equal or greater importance, however, appears to be the system's adaptability and amenability to civil defense, public service, or medical applications.

I performed a preliminary patent search the week of Apr. 12–16, 1994, to the best of my own ability. The closest or most relevant utility patent which I could discover is U.S. Pat. No. 4,996,703 to Gray (1991). Gray's abstract specifies utilization of only the telephone network, and does not include wireless capabilities. This is confirmed in FIGS. 2-A through 2-C as well as FIG. 3. In addition, Gray's innovation does not provide for discreet monitoring or other user-friendly manipulatory features inherent in my system. Gray's abstract specifies that a "monitoring and control system has a programmable apparatus connected to" equipment to be monitored. Gray's system specifies "alarm conditions when the monitored inputs reach predetermined values" without provision for multi-tasking between diverse media, modes, or components. This is confirmed in his abstract specification that the system "dials automatically over the telephone network to reach an operator when an alarm condition is detected". Gray's system further specifies provision of "complete status of monitor and control ports", with no allowance for custom or advanced modes of operation. His abstract further specifies notification by "synthesized voice", with no provision for more user-friendly modes of operation, interrogatory routines, or notifications. Further, Gray's abstract offers no provision for diagnostic routines or procedures; nor does it suggest utilization of cable, wireless, or spread-spectrum transmissions or broadcasts.

It is my humble opinion that my invention far surpasses the prior art which was available at the time of its inception in March–April, 1993. To my knowledge, no one at that time had yet begun to explore the advantages of such a multimodal communications networking system as mine. It is my opinion that my invention incorporates and advances the utility of a number of fractated technologies into a new combination in such a way as to solve long-felt needs with added benefits which are unexpected, novel, and unobvious.

OBJECTS AND ADVANTAGES

Several objects and advantages of my invention are:
(a) to provide site-respective user or system safety and integrity through ease of manipulation and "triggered" prompt or discreet routines in a user-friendly format;
(b) to provide for user or system safety and integrity through the use of progressive selectivity, qualifications, a manipulation of, interrogatory, or intercessory routines;
(c) to provide for user or system safety and integrity through the use of continuous, interval, and/or events-driven diagnostic routines, manipulations, and adjustments;
(d) to provide for user or system safety and integrity through multiplicity, intelligent management, or cross-utilization of channels and transmission media or modes;
(e) to provide for user or system safety and integrity through comparison and manipulation of data, inputs, or other criteria in or between diverse storage or processing components;
(f) to provide for user or system safety and integrity through intelligent provision for back-up of emergency power and automated data protection and forwarding as warranted;
(g) to provide for user or system safety and integrity through enhanced management, intelligent evaluation, or efficient forwarding of intelligence and data to local or distant components;
(h) to provide for user or system safety and integrity through intelligently engaged wired or wireless peripheral storage, relay, or transmission equipment for efficient data collection, dispersal, comparisons, or dissemination as warranted;
(i) to provide for user or system safety or integrity through intelligent modification or adjustment of singular or multiple system parameters or components by electronic means as defined or warranted by user or system requirements;
(j) to provide for user or system safety and integrity through intelligent system or user-assisted switching and selection of components and transmission media tasking in the network and devices;
(k) to provide for user or system safety and integrity through securitized means for remote accession with prompt responsive interaction between system-compatible data/asset storage and management devices and components;
(l) to provide for user or system safety and integrity through remote user-friendly, real-time, or intuitively formulated automated appraisal, relative to parameters, of historic, current, predicted, or anticipated events;
(m) to provide for user or system safety and integrity through method(s) for selective acceptance or denial of proposed incoming data transmissions at monitored fixed and mobile locations;
(n) to provide for user or system safety and integrity through automated prompt or discreet appraisal, signalling, transfers, or return notifications or actions in efficient quick-response format;
(o) to provide for user or system safety and integrity through user-friendly incremental manipulation of data while requiring less mental and physical distraction;
(p) to provide for user or system safety and integrity through user-friendly enhanced application of neighboring systems-related and non-systems equipment through modular plugs, jacks, or wireless relay;
(q) to provide for user or system safety and integrity through alternate means of transmission for incremental enhancement, or in the event of failure or loss of any one medium;
(r) to provide for user or system safety and integrity through securitized method for routines or events log updates for record-keeping, billing, or system-oriented or user-oriented databases;
(s) to provide for user or system safety and integrity through securitized development, registry, and deployment of databases, which may provide cognizant security based on individual, zone, or collective events patterns or data:
(t) to provide for user or system safety and integrity through enhanced efficiency, throughput, or economy of interactions or transfers in all of the above or further applications.

Further objects and advantages of my innovation appear to be obvious when compared to previously existing prior art in communications and networking. For years now, those who carry portable phones have complained of the inherent lack of privacy in being "on call" at all times. With the impending onset of "500 channels" of the "information superhighway", many parents and authorities are becoming concerned that their families and children will be even more inclined toward a "couch potato" lifestyle. Home and business alarm systems have been woefully inadequate and unreliable, with millions of dollars in losses occurring each year from false or failing alarms. Police departments all over the nation were being overwhelmed by alarm calls, and many had begun charging a fee for responses over a designated limit. Home communication systems have done little or nothing to promote interpersonal development between family members and loved ones. Communications networks in general had done little to facilitate dextrous or advantageous manipulation of available features. With the growing number of on-line computers and cellular phones, communications companies have a need for more effective management, routing, and monitoring of traffic. Business communication systems have been developing all too slowly, with too many missed or errant calls, and few intelligent operating system management tools. As recently as 1993, the telephone companies were struggling with the problems inherent in growth of metropolitan areas. It was reported that Atlanta would by necessity probably be split with another new area code being added soon. Conversely, now it has been announced that this, the nation's largest area code toll-free zone, will probably be approved for expansion by Mar. 1, 1994.

Inaccurate or errant billing, as well as fraud and theft, was now responsible for millions of dollars in losses each year. The rise in the number of small businesses in the past two decades has not been met with commensurate products or innovations tailored to fostering of efficient small business operation. Much wasted labor and capital have been lost on the inefficiency inherent in incremental loss of control felt during the growth of small and large companies alike. Labor-intensive efforts are generally by necessity forfeited in favor of more attention directed toward more efficient management or supervision. My innovation provides assistance in these and other areas either individually or collectively. More localized small service, production, or manufacturing facilities are needed to meet local supply considerations. Capacity utilization rates of small and large businesses alike can benefit from an intelligent system monitoring application with selective human intervention. Electrical and other utility concerns can benefit from the application of the system for further maximization of production, distribution, utilization, or exploration. The system has innumerable possibilities for application in the medical field at a time when massive and far-reaching changes are occurring as our nation's health system is being reformed. In these and many other smaller and larger applications, my innovation offers the opportunity for intelligently formulated management of an increasing number of routines, while offering increased freedom, efficiency, safety, and flexibility which have never been offered in communication or distribution circuits, devices, operating systems, or networks. My innovation further assists in the redistribution of the economic elements of land, labor, capital, and management, so as to create an efficiency which is having, and will have an even greater impact, on the American and global economies.

DRAWING FIGURES

FIG. 1 depicts the basic concept of the invention. Solid or dotted lines all represent singular or multiple two-way broadband broadcast or transmission media or modes. Dotted lines between lower three components in the drawing are included only to note that terminal or remedial devices may be equipped for two-way intercommunication without relay or accession through dedicated fixed or mobile platform. These devices or any other valid system component may interconnect with other similar networks, or dissimilar non-system devices or components as applicable or authorized. Methods of connection(s) comprise modular jacks or plugs, direct or peripheral interconnection or relay between appropriate input/output ports, bridges, routers, repeaters, or other wired or wireless development methods.

FIG. 2 depicts a basic configuration of the pocket-sized access device. The convenient size of the apparatus provides discretionary disposition of incoming signalled events or interactions, relative to parameters. Placement of a minimum number of touch-manipulated "triggers" on the device allows prompt remedial formulations by the user, according to nascent availability. This device may be equipped with singular or multiple transmitter/receivers, data processors, or other components depending on configuration or applicability, for relay or engagement of neighboring system or non-system components. Methods of connection(s) comprise modular jacks or plugs, direct or peripheral interconnection or relay between appropriate input/output ports, bridges, routers, repeaters, or other wired or wireless development methods.

FIG. 3A depicts the "triggers" apparatus, and is intended to note that the distributive triggers may also be appointed as acoustic, voice-responsive, or electronically activated. Dotted lines represent multiplex or cross-utilization applicability between devices or components. FIG. 3B depicts an embodiment of the manually deployed "triggers" apparatus in a hand-held phone. Incorporations of such an array within any applicable device provides complementary ease of interactive manipulation, as well as incremental surety of consummation, and further multiple or subsequent manipulatory routines or modes. Methods of connection(s) comprise modular jacks or plugs, direct or peripheral interconnection or relay between appropriate input/output ports, bridges, routers, repeaters, or other development methods.

DESCRIPTION—FIGS. 1, 2, 3

The basic concept of the invention is illustrated in FIG. 1. Transmission/reception components at monitoring, remedial, or terminal stations forward or relay selective information as warranted to central processing unit(s) for enhancement or delegation of advanced or alternate routines. The most efficacious embodiment of the subject innovation is in its use to provide a method for selective engagement of receptions of multi-media broadcasts or transfers in home or mobile environments. Variations of this embodiment of the invention are heretofore referred to as the home enhancement network or the business enhancement network configuration, also illustrated by FIG. 1. Central processing units in conjunction with monitoring broadcast receptors and other applicable fixed or mobile monitoring and communication components receive, store, and process inputs from wired and/or wireless on-site or off-site systems and non-systems components continuously, at intervals, or on demand as warranted by system parameters and current, pre-set and anticipated inputs, which include "quick-response triggers" apparatus reciprocal or alternate notifications. Central processing units/multi-media receptors forward notification of impending full or partial coded voice, video, data, or other transmissions as warranted, dictated by system parameters, through locally applicable wired and/or wireless communication methods. Incoming transmissions to the system, such as a current or proposed movie, song, or commercial product offering, may be compared for system compatibility in terms of authorization, or comparison to parameters for acceptance or denial prompts or routines. If warranted by priority schedules or parameters, queries or notifications may be initiated and forwarded to on-site and off-site locations of user-friendly conveniently configured pocket-sized quick-response triggers apparatuses (FIG. 2), for prompt return notification comprising polled component's degree(s) of availability or degree(s) of intended response. Locations of these quick-response triggers apparatuses may include any authorized fixed or mobile system or non-system monitoring or relay components or terminal devices. Quick-response triggers apparatuses locations by definition notify respective components in real-time parameters of degree(s) of relevant information comprising degree(s) of intended, forthcoming, or proposed interactions. Means for prompt notifications by quick-response triggers apparatuses may comprise manual, voice-driven, and/or electronic triggers. Quick-response triggers apparatuses (FIGS. 2, 3) or other system-authorized devices notify reciprocal or alternate components of degree(s) of intended interactions comprising or ranging from, say: deferred or delayed interaction, to; qualified or limited interaction, to; full or formulative interaction. Quick-response triggers are adaptable to convenient location and physical construction as to allow incorporation of the array with accompanying ease of manipulation, within existing or compatible electronic device designs (e.g., hand-held phones as depicted in FIG. 3-B), and are receptive to inherent user attributes. Quick-response triggers may be reprogrammed to alternate tasking as dictated by routines or priority schedules of system parameters and users in the particular application. Authorized fixed or mobile system or non-system components or devices may have the capacity for one or more wired or wireless transmission method(s) subject to system requirements of particular application(s). Wired or wireless transmissions priorities schedules or routines are dictated by current, pre-set, and/or predicted parameters. Respective components of the quick-response apparatus(es), device(s), or component(s) may be conducive to individual deployment(s) according to physical component separation and/or electronic component separation (FIG. 3-A). Component relay to on-site or off-site system-authorized devices comprises peripheral interconnection via wired or wireless relay methods of communication, signalling, data, or power transfers. Multiple media capability or variable modes of operation may enhance incremental database qualifications for efficacy of cognitive or formulative virtues. Multiple ongoing transmissions or interactions between location(s) may comprise serial, parallel, or multiplex configurations for incremental system enhancement or enrichment of cognitive or formulative virtues. Multiple ongoing transmissions configurations or modes may dictate parameters or routines, as dictated by nascent parameters. Interactions between components may often be in flux, with switching of component tasks comprising dictation of parameters according to parameters, programs, or routines. Utilization of comparative capabilities or qualities of respective components or media, achieves incremental utilization of cross-utilization capabilities or capacit(ies). User or system securitization comprises system-defined or user-defined routine(s). mode (s), designation(s), access code(s), multiplexing, etc.

Operation—FIGS. 1, 2, 3

Central processing units and locally applicable peripheral monitoring, relay, control, utility, and communication devices may be located at fixed and/or mobile locations, including homes, businesses, vehicles, etc. These CPU's receive, store, and process inputs as warranted from wired or wireless on-site or off-site systems and non-systems stimuli, including other applicable receptors, servers, CPU's, broadcast media, etc. Optional multiplicity of wired or wireless communications media between locations insures continuity of, and provide asynchronicity of transfer, data, or communications between locations. These communications may be coded with identifications or other qualifications before or during broadcast or transmission. Monitoring at home, business, vehicle or other location, is typically performed by arrays of CPU's, microprocessors, transmitter/receivers, etc., from singularity of application, to complex multiple network topographies. Fixed or mobile monitoring or diagnostic routines may be performed continuously, at intervals, and/or on demand as dictated by system parameters and current, pre-set and/or anticipated events. Respective locations may provide or be subject to encryption based on user or system preferences or predetermined criteria. Respective locations may have reserve or alternate backup power source, and pre-programmed directives for data and equipment protection in case of main power supply failure. Individual, zone, and/or collective inputs to or between respective central processing units may be logged, assimilated, and/or analyzed for adherence to, or deviation from, acceptable levels of tolerance. Central processing units in multi-media entertainment broadcast facilities may broadcast or transmit data packets, or keys, which are embedded in the digitized programs. Upon recognition of incoming coded proposals for engagement of broadcasts or transmissions from on-site or off-site system or non-system components or devices, respective polled central processing units or microprocessors may analyze data keys or other qualifications for compatibility with system or user-defined acceptability, probability, volume indices, event sequence patterns, etc. Appropriate routines may be accessed, including return acknowledgments to polling CPU's, alternate reports as warranted to any system components, signals, alarms, or possible remedial actions as warranted. Remedial or terminal intervention and remedy of alarms or other system status may be possible either at or distant from interaction-monitoring location, as authorized by nascent priority schedules, conditions, or system configuration(s). Alternately, the polled CPU may be a component of a wireless portable receptor for incoming television or radio signal broadcasts, and equipped with a "quick-response triggers" apparatus. When notification of a proposed incoming "live" or predetermined reception is noted or recognized, the "quick-response triggers" apparatus of the polled unit may treat the proposal with the degree of authority allocated it during the ongoing period; or direct the signal reception or engagement to an appropriate on-site or off-site component for further evaluation or processing. Variables which may dictate the unit's nascent authority for decision-making include user quick-format or extended programming formats, which may be programmed directly on the unit, or through wired or wireless relay from off-site or neighboring on-site user or system-authorized devices. Central processing units in respective locations, networks, etc., may relay data within or between individual devices or components to achieve desired results of incremental fluency and enhanced system efficacy. Thus the flow of data may be manipulated between devices and components, to achieve special effects such as scrolling, rewind, fast forward, or other advanced manipulatory regimen, etc. CPU's or other microprocessor-based devices including "quick-response triggers" apparatuses may assimilate, qualify, process, and manipulate data by means of comparison with reported inputs derived from other accessed microprocessors and applicable components. The user-friendly triggers apparatuses act as intelligence receptors, software-defined switches, and/or manipulatory output assistance devices, to allow enhanced management, data flow, tasking, and/or communications as necessary between components. Adjustments of parameters or switching of component tasking are performed by user or system components as warranted, including data transfer or accession to user or system-defined routines, including possible alarm status. Events are managed according to user or system inputs, priority schedules, system qualitative and quantitative analyses of events, conditions, or interactions (or lack thereof) between system or non-system components and devices. System integrity may be enhanced by selective electronic prequalifications, and progressive cognitive and interrogatory routines. Formulative conclusions or advanced routines may be engaged, according to qualifications and prioritizations, with predetermined, designated, or errant events or conditions accessing alternate components or routines, including possible local, system-wide, or site-specific alarm status. Authorized users, callers, or devices accessing system-related CPU's and components may be appointed discreet or human-voice options, or other user-friendly methods for manipulation of choices. Coded, nuanced, or directly postulated or associated signal qualities may be employed for engagement routine(s). Custom tailoring of programs, messages, routines, parameters, coding, etc., may be formulated with appropriate responses to menu selections by users or system-authorized devices, including "quick-response triggers" apparatuses. Alternate routines may also be dispatched from and/or through triggers devices or other authorized locally applicable system or non-system equipment with appropriate responses to menus as presented. Historic, current, and/or anticipated events, conditions, and interactions may be recorded, stored, processed, coded as possible, and appropriate routines accessed. Formulation of individual databases derived from historic events may be developed, and automated remedial interactions generated between applicable components as necessary. outgoing wired and/or wireless communications transmissions may be relayed by modems or other devices, including bridging and routing equipment, according to system or device parameters and relevant interactions considerations. Communications may be forwarded to authorized locations as dictated by user or system specifications and parameters, signals, controls and ongoing interactions. Individual, zone, and/or collective notifications of historic, current, or anticipated events, as well as notifications of impending degree(s) and qualities of coded voice, video, and/or other transfers or transmissions may be thus dispatched to such locations as are authorized by the user or system to receive transfers or communications from the transmitting devices or components. This may be facilitated by deployment of transmissions through locally feasible, applicable, and appropriate wired and/or wireless communication or power transfer channels, whether analog, digital, spread-spectrum, etc. Multiple transfer or communications media are most efficacious, offering extended versatility, functionality, continuity, and safety to the system as well as components and users. Communications may be forwarded to and/or through locations of authorized on-site and off-site fixed or mobile system or non-system relay components and terminal devices, including "triggers"-equipped devices and components. "Triggers"-equipped components by definition are equipped for quick-response acknowledgments, return notifications, queries, or commands to or from respective polled or polling components, in real-time or system-compatible parameters; typically comprising degree(s), nature(s), and/or other qualifications as necessary, of intended forthcoming or proposed event(s) or interaction(s). Thus, respondent notification by use of "quick-response" manual, voice-driven, and/or electronic "triggers", may apprise applicable system components of a range of intended interactions such as: (a) deferred or delayed interaction; (b) limited, qualified, or intermediate interaction; (c) full or formulative interaction by users and devices. Upon signalling from incoming broadcasts, communications, or transmissions, the "triggers"-equipped system component may be notified of the source, type, quality, volume, etc., of incoming transmissions by appropriate coded signalling respective to parameters. These signalling means may comprise visual, audible, or electronic notifications or manipulation(s) relative to parameters. Audible or visual signalling may be in the form of industry-standard lighted or graphic displays, tonal variations, or other signalling in terms relative to parameters. Custom-tailoring of programs, messages, routines, parameters, displays, etc., may be executed with appropriate selection(s) from menu items available in either the CPU at the originating location, or through the quick-response apparatus or other locally applicable user or system-authorized system or non-system device(s). Inputs, pre-determinations of interactive availability, and commands may be stored in a quick-response apparatus during a period of detente, until appropriate receptor is available for consummation of the interaction. Electronic, audible or visual prompts may notify the user or system of progressive or predetermined events consummations. The signalling means may also include signalling and control of electrically or electronically-activated devices and components, as deemed appropriate and locally applicable, through authorized relay devices. Data, transfers, or actions relevant to electrical power usage, control, management, etc., may be forwarded through authorized on-site or off-site system or non-system components as warranted by conditions. An electrical network monitoring apparatus with optional database may be employed at individual site(s) to collect, analyze, disperse, or manipulate indications or notifications which occur in individual, zone, or collective circuits, locations, etc.

The quick-response triggers are typically amenable to convenient location and physical construction as to allow accessible incorporation within existing electronic devices (e.g., mobile phones, computers, televisions, remote control devices, etc.) so as to provide ease of access and further manipulation. Thus the user or device is enabled to respond to polling or communication-originating system components with prompt reciprocal acknowledgment and/or notification of intended interaction or commands, according to availability. Notification may also be forwarded to other system components by wired or wireless communication method, as dictated by system and device configuration, and program parameters and inputs. Pre-designated interactions or inputs may trigger further advanced interactions, including accession of remedial components or stations as authorized.

The quick-response triggers apparatus may be field-programmable to alternate tasking as dictated by routines and priority schedules of system parameters or users and specific application. Automatic reprogramming as dispatched from authorized distant or proximate network components may be accomplished according to the system and component configurations. Alternately, reprogramming may be achieved by the triggers apparatus user through direct reprogramming of the device with assistance by user-friendly prompts. The triggers apparatus may have the capacity for one or more wired or wireless transmission method(s) subject to system requirements of particular application(s). Other advanced configurations may include multiple wired or wireless transmitter/receivers and/or multiple microprocessor and central processing unit arrays, which may operate in tandem, series, parallel, client/server, or other topographies with other system and non-system components. These enhanced processor arrays and program assignments may serve to enhance system integrity of throughput by means of data comparison and manipulation. Respective components of the triggers apparatus devices may be subject to individual deployment to further tasking according to physical component separation and/or electronic component separation by electronic switching. Thus, asynchronous transfers of data and communications may be accomplished between two or more locations or components. System-related switching is managed according to priority schedules and other cognitive and formulative components and programs, and subject to inputs from users and components. System components, parts, and devices may be modular, to accommodate ease of expansion or replacement. The triggers apparatus embodiment may be enhanced by further hard-wired deployment of one or more of its components through neighboring existing land lines and other applicable equipment through the use of modular jacks, direct connection, or wireless relay, dictated by system configurations. User and system safety are typically highest priority, with user-defined hot keys, emergency conditions parameters and assessments with possible remedial triggered interaction, security access codes or routines, etc. System security may be enhanced by allocation of remedial monitoring stations, including 24-hour central monitoring stations, system or operator of which may be available for prompt or routine interaction as warranted by conditions or configurations.

Summary, Ramifications, and Scope

Accordingly, the reader will see that my innovation is an enhancement to utility, efficacy, fluency, and security in monitored or monitoring transmission, broadcast, or communications circuits or network configurations or topologies. Securitized components at on-site or on-site fixed or mobile locations are notified of ongoing events and conditions through incoming wired or wireless broadcasts or transmissions originating at the same or other location(s), by means of reception, processing, storage, or distribution devices. Wired or wireless digital or analog transmissions, communications, or broadcasts into any monitored device (such as a home computer/cable television appliance, network, hand-held communication device, portable radio or television, laptop computer, etc.) are coded as possible. This advanced or concurrent coding provides identification or other qualifications, so as to assist terminal user or device in decision-making notification, formulation, processing, or facilitation of prompt return signalling, including mitigation of unfavorable conditions. The central processing units or peripherals will typically process and evaluate as much data as possible, to enhance devices' or users' availability to other stimuli, as well as further parity between the user and the system. Further queries and interrogatory routines may ensue if warranted, with remedial adjustment of parameters and routines as necessary. Conditions assessments at the location, whether derived from incoming transmissions or from other site-based components (such as security alarm monitoring equipment), may trigger alternate routines ranging from advanced intelligence gathering or processing modes, to conditions adjustments or mitigations, to advanced intercessory modes. In the "home enhancement network" application, movie or song offerings or other broadcasts from wired or wireless media may be offered for downloading or direct broadcast as availability permits, to singular or multiple locations. Offerings are broadcast or transmitted directly to the home in digital or analog form, coded as possible to inform the polled location's central processing unit(s) or microprocessor(s) of exactions, to assist in authorization of engagement and enforcement of user restrictions. These restrictions may include mandates as to the quality, quantity, and nature of the proposed incoming transmissions, including coded movie ratings expressing age restrictions, number of violent acts in the movie, or sponsor identification. A "trailer" of a movie offering may be digitized and broadcast, along with a possible embedded commercial endorsement which must be perused before access to the entertainment portion of the trailer is permitted. Consumer-specific offerings may be broadcast, and selectively engaged by the H.E.N. as dictated by the household members' pre-selected criteria. Other complementary transaction routines such as account status, billing updates, actual automated exchange of funds upon acknowledgment and acceptance, etc., may be included as embedded features of incoming offerings, as a prerequisite to consummation of program downloading or transfer. The polled H.E.N. is requested to respond to the polling unit in terms of degree(s) or nature of interactive determinations or intents. Incoming offerings deemed inappropriate by a polled home enhancement network's guidance parameters may be promptly denied access. Conversely, notification of the proposed interaction may be forwarded to one or more on-site or remote components for further qualification or optional intercession, depending on components' availability. These wired or wireless communications are initiated according to system or device parameters, aided by cognizance inherent in the incrementally fluent nature of the enhanced intelligence modes. Comparisons between components in the multiple modes inherent in home or other applications, such as industrial power supply/transmission, communications networks, enhance system fluency through incremental cognitive and formulative intelligence and communication realm(s). For example, a home enhancement network may access spread-spectrum capability inherent in cross-application of radio or microwave transmissions into a house's electrical wiring system. This multiple application is useful in the event of loss or disturbance of, say, longer-range radio or microwave reception; or simply for the incremental gains felt in the resultant "reciprocal respondency", "incremental multiplexing", and "indicative memory" contributions provided by the asynchronous transmission mode therein. Continuous, interval, and/or events-driven monitoring of respective components in the network provide prompt remediation of errant or unwarranted conditions. Of equal impact is the gain embodied in the provision of additional optional intercessory modes through the "quick-response apparatus" whether on-site or off-site with the device. This provides a greater degree of assurance of continued operation and accessibility to or by the user or system. In the event of user unavailability, the system may respond with appropriately formulated intelligent management or manipulation by cognizant and formulative virtues inherent therein. Additionally, user or system safety or integrity may be enhanced with safety through advanced singular or correlative user or system monitoring modes.

Conditions requiring intercessory assistance may include such errant events as the attempted downloading of a movie with a non-homogeneous rating, or peripheral introduction of other intrusive data such as home-based security alarm conditions. Notification of these or any conditions, including incoming personal communications, may be forwarded to one or more on-site or off-site terminal or remedial remote stations for constructive deliberation, as dictated by cognizance and availability, for acceptance or denial of the action or offering. Of course, this same method can be used to carry on an extended virtual dialogue with the H.E.N., or to send or receive discreet interval reports or directives, with selective monitoring. A problem arises, however, when the stream of reported data increases to overwhelming proportions in terms of interaction frequency or flow, or inaccessibility of the user to react immediately to the polling unit. The "quick-response triggers" device or apparatus, however, with its singular or multiple array of manually-deployed ergonomically-efficient buttons, or electronic or acoustic triggers, enables the user to promptly signal the polling station (or other applicable components) of the availability of the user or polled device. Identifications and qualifications of the polling device or party are intelligently formulated and routed to the "triggers"-equipped apparatus. Entire routines or menus may be forwarded; or pre-programmed compatible routines may be retained in the storage component of the "quick-response triggers" apparatus. In the event of user absence or other unavailability for interaction, the "triggers" apparatus may respond with appropriate return or alternate notifications. These responses may include such information as the device or component is equipped to store or process. Responses may range from user-defined or system-defined pre-set electronic responses or verbal greetings, to device or system-calculated reports or engagements. Advanced routines may signal other distant or neighboring system-authorized components or devices, to enable further versatility or formulations. Advanced configurations may incorporate modular jacks for direct-wired relay to other components. Configurations may incorporate multiple transmitter/receivers and multiple microprocessors for intelligent switching and formulative solutions to multiple transactions. In the favored configuration for remote on-site or off-site monitoring of the H.E.N., a hand-held or pocket-oriented device or phone may be equipped for radio or other wireless communications, as well as modular jacks for land-line deployment as necessary or available. This hand-held device may be equipped with one or more of the "quick-response triggers" apparatuses as necessary. A "triggers" apparatus may be housed in a smaller hand-held configuration which manages the interactions of some or all of the neighboring system-authorized components, through wired or wireless relay application. Thus, this smaller device may be less unwieldy, and allow flexible application through neighboring system-authorized components whether at a fixed or mobile location. The transmitter/receiver and microprocessor components may be modular, to allow ease of replacement to adjust to changing system configurations of the particular user. The "triggers" apparatus may be incorporated within any communication or broadcast reception device, including home-based or portable multi-media reception devices. In the manually-driven quick-response triggers array, three buttons may be arranged in a cluster which may be conveniently located for quick accessibility. One button may be programmed to signal the system or caller of a deferred or delayed interaction. The next button may signal the system or caller of an intermediate, limited, or qualified interaction. Either of these buttons may be pre-programmed or re-programmed to trigger alternate routines which further signal the system or caller with such notifications as "estimated time of delay". The third button may signal the system or caller of full or formulative response, including such other system-defined information designed to enhance efficacy. This array can be fully appreciated in heavy traffic or in intense business situations, where even routine incoming calls on a portable phone can be distractive and inconvenient. The manipulative array of buttons of the quick-response apparatus allows discreet and judicious interaction of the user according to his or her availability. Selection can be made from the "interactive availability menu" without taking one's eyesight and attention away from the roadway ahead, or while the unit is held out of sight under a table or in a coat pocket, for example. Deferred or delayed interactions may result in accession to alternate or advanced routines, including designated outgoing messages which may correspond to recognition of incoming caller, time of day, priority schedules, etc. These alternate messages may be pre-programmed or field-programmed, dispatched as voice mail to a caller, etc. The "detente" feature increases the fluency and independent functionality of the system and user, by accepting and recording audible and other inputs, and storing them until a polled receiving station is ready, for example. Virtual dialogue, control of system and devices, or reprogramming of parameters may be accomplished with minimum of effort through intuitive and informative qualities of detente commands and responses. The detente feature may also be used for manipulation of programs, error correction or reduction, and management of flow in ongoing interactions, such as automated switching, transfer, and flow regulation, and other enhanced directives. For example, a digitized movie, song, or recorded message may be "forwarded" or "reversed" at user or system will, through intelligent manipulation of the digitized data stream in and through networked monitoring components in an application. Flexibility and reliability of portable wireless quick-response components and other components may be enhanced by optional hard-wired application through modular jacks, receptacles, etc. Integrity of the quick-response apparatus and other system components is enhanced by the use of advanced routines and alarms upon discovery of errant conditions. Reserve or alternate power sources may be accessed by the user(s) or system devices, in the event of power failure. Variations of many features which are described above for use in remote devices to monitor the home enhancement network are inherent in or applicable to the monitored location H.E.N. or B.E.N., etc.

Although the description above contains many specificities, these should not be construed as limiting the scope of the invention but as merely providing illustrations of some of the presently preferred embodiments of this invention. For example, the system may be applied to a range of applications, from enhancement of individual circuits in miniscule devices, to massive applications such as global surveillance or communications. Functionally, the system may be applied to systems control; automated database formulation and analyses; monitoring and control of activity in security or civil defense applications; remote engagement or notification of E-mail or other communications; regulated home care/infusion therapy; personnel, circuit, or network efficiency; automated research and/or development; surgical procedure monitoring; traffic management; quality control; automated production, etc. The manually deployed quick-response triggers apparatus may be located at or near collocation of fingers on user's hand during normal use of a device, for ease of disposition. This array (or other deployment modes) may be protected by a cover to prevent errant deployment; placed at convenient locations on or near applicable user or system components: such as automotive steering wheel rims, in association with the Mobile Enhancement Network; within mobile cameras, televisions, radios, pocket-sized devices, etc.; within door jambs, electrical outlets, or other devices for use as transaction registers with regulatory manual or communication features. The voice-driven triggers apparatus may be located in any device or location where sonant application is feasible; within or proximate to locations of any voice or sound input or occurrence. The electronically-driven mode may be triggered by any monitoring device in conjunction with processing, relay, or storage components with capacity or extension for accession of stored parameters, or stimulation of other peripheral on-site or off-site components. The switching or notification processes may be automated or prompted, minimal or complex in nature or content, determined by user presets, developed by system observation, subject to system components availability and priority schedules, etc. The cognitive or formulative detente and distribution feature applicable to inputs or actions may be used to structure and maintain the flow of data between or in system devices, as well as relay components. In the home or business enhancement networks, manipulation of data between such devices may be used to achieve such special effects as rewind, "instant replay", slow-motion effect, or instant access to any point of reference within the program.

Thus the scope of the invention should be determined by the appended claims and their legal equivalents, rather than by the examples given.

What is claimed is:

1. A system for detection and reporting of conditions of devices and/or components in circuits or networks, comprising transmission or reception of signal indications, said indications comprising relative degrees of readiness or ability of one or more devices or components to communicate and/or intercede in system processes.

2. A system as set forth in claim 1 wherein said means for detection of conditions includes means for detection and reporting of relative degree of availability of devices or users for proposed monitoring or interaction.

3. A system as set forth in claim 2 wherein said relative degree of availability of devices or users is reported in one or more quick-response formats comprising one or more of the following:
   (1) full or formulative response or interaction,
   (2) partial, limited, or qualified response or interaction, or
   (3) deferred or delayed response or interaction.

4. A system as set forth in claim 1, further comprising means for automated system processing of events or conditions, wherein said detected events or conditions are presented to one or more general-purpose memory units in one or more programmable logic devices at one or more component locations.

5. A system as set forth in claim 4, wherein said general-purpose memory units in said programmable logic devices are subjected to operation by one or more input/output devices which utilize binary computer software code.

6. A system as set forth in claim 1, further comprising means for said detected conditions of one or more users or devices to be subjected to internal or external analog or digital processing, whereby attributes of the processed intelligence are derived for utilization as comparator components.

7. A system as set forth in claim 1, further comprising means for indication of said detected conditions to be forwarded to or from integral input/output device, by appropriate bus device or direct interconnection, to or from circuits comprising one or more of the following types:
   (1) transducer circuits,
   (2) detector circuits,
   (3) amplifier circuits,
   (4) oscillator circuits,
   (5) modulation or demodulation circuits,
   (6) relay circuits,
   (7) filter circuits,
   (8) buffer circuits,
   (9) volatile or non-volatile memory circuits, or
   (10)) programmable logic circuits.

8. A system as set forth in claim 1, wherein said detected conditions of devices or users are reported in one or more of the following:
   (1) preliminary,
   (2) concurrent, or
   (3) subsequent
      in relation to other signal(s) comprising primary communications traffic between devices.

9. A system as set forth in claim 8, wherein said preliminary, concurrent, or subsequent conditions reports are encoded within one or more primary traffic frequency or sub-carrier frequency in communications transfers between devices.

10. A system as set forth in claim 8, wherein said preliminary, concurrent, or subsequent conditions reports are transmitted in one or more signal frequencies which are separate and distinct from one or more primary traffic frequencies or sub-carrier frequencies.

11. A system as set forth in claim 8, wherein the detection of the presence of one or more unmodulated carrier bandwidth within one or more predetermined frequency ranges comprises the detection of conditions.

12. A system as set forth in claim 8, wherein the detection of the presence of one or more predetermined modulations and/or other signal characteristics of one or more frequencies comprises the detection of conditions.

13. A system as set forth in claim 1, wherein said means for detection of conditions comprises:
   (1) means for monitoring of real-time or recorded programs or sub-units thereof,
   (2) means for generation of dedicated or broadcast digital and/or analog signals and conditions, and
   (3) means for distribution of said programs or sub-units in accordance with predetermined or developing allocation of priorities.

14. A system as set forth in claim 13, wherein said means for detection of conditions includes at least one broadcast or dedicated signal generation facility in conjunction with such relay equipment as necessary to transmit said digital and/or analog signals and conditions to at least one home station and/or at least one remote station.

15. A system as set forth in claim 13, wherein said means for detection of conditions includes at least one broadcast or dedicated signal generation facility in conjunction with such relay equipment as necessary to transmit and receive digital and/or analog signals and conditions to and from at least one home station and/or at least one remote station.

16. A system as set forth in claim 13, wherein said means for detection of conditions includes at least one home station and/or at least one remote station which monitors broadcast or dedicated signal transmissions from digital or analog signal generation circuits.

17. A system as set forth in claim 1, wherein said signal processing includes multiple independent wired or wireless modes which enable communication between one or more home stations and/or one or more remote stations, whereby users or stations are insured performance by means of alternate and divisible communication modes and devices.

18. A system as set forth in claim 17, comprising means for alternate or complementary application of one or more wireless devices for use as wired devices supported by at least one wired network, and wherein said wired network recognizes device address and/or other states or attributes of said wireless device or its components.

19. A system as set forth in claim 1, wherein one or more circuits monitor power supply to system or non-system components or devices, whereby said monitoring circuits trigger predetermined actions and/or reports to devices or users.

20. A system as set forth in claim 1, including means for multiple data processors within or in attachment to at least one home station and/or at least one remote station.

21. A system as set forth in claim 1, wherein said detection of conditions is interpreted according to alternating modes of translation which are appointed by one or more predetermined programmable logic device(s) or by user override through one or more input/output device(s).

22. A system as set forth in claim 1, wherein signal processes are logged in a general-purpose memory unit of a programmable logic device having access to a database of historical and/or hypothetical events, whereby subsequent events are anticipated by projection or calculation.

23. A system as set forth in claim 22, wherein current signal processes are given precedence over historical or projected events, whereby control of system functions are dictated by user system-designated override device in accordance with priority schedules as designated by system or user.

24. A system as set forth in claim 1, comprising means for at least one transmitting station to forward to at least one receiving station at least one notification of a proposed event, said event comprising the production of an array of acceptable responses to at least one receiving station.

25. A system as set forth in claim 24, wherein a transmitting station user, input/output device, and/or programmable logic device performs the function of formulating said array of acceptable responses.

26. A system as set forth in claim 24, wherein a receiving station user, input/output device, and/or programmable logic device performs the function of formulating said array of acceptable responses.

27. A system as set forth in claim 24, wherein at least one other predetermined device is designated as a supervisory station, whereby other proposed or ongoing transmitting and receiving stations processes are thereby engaged by one or more relatively unburdened alternate system components.

28. A system as set forth in claim 1, comprising means for detection of conditions which deviate from a predetermined array of acceptable conditions to trigger at least one alarm status condition, whereby at least one alternate program or event is activated.

29. A system as set forth in claim 1, further comprising means for at least one predetermined device or user or to intercede in system processes in accordance with interpretation of conditions by said device or user.

30. A system for critical signal processing and timely formulation of communications flow between components in circuits or networks, comprising means for continuous, interval, and/or events-driven detection of conditions of one or more devices or users in said circuits or networks, said means for detection of conditions of one or more devices or users including one or more wired or wireless input/output devices, said means including means for comparing input or output signals for determination of adherence to or deviation from predetermined specifications of one or more acceptable values.

31. A system for timely formulation and communication of critical signal processing, comprising:
 (A) at least one home station including
  (1) means to detect one or more conditions,
  (2) means to automatically forward one or more signals in accordance with said detected conditions, and
  (3) means for qualifying said forwarded signals according to detected availability of one or more remote stations; and
 (B) at least one remote station including:
  (1) means to receive one or more signal(s),
  (2) means to evaluate one or more signal(s),
  (3) means to determine availability of one or more said home stations or remote stations, and
  (4) means to communicate with one or more said home stations or remote stations in accordance with one or more detected conditions.

* * * * *